United States Patent [19]

Tyler

[11] Patent Number: 5,531,136
[45] Date of Patent: Jul. 2, 1996

[54] BRAKE OPERATING MECHANISM

[76] Inventor: Stanley R. Tyler, Knapp Corner House, Painswick, Gloucestershire, England, GL6 6YE

[21] Appl. No.: 321,811

[22] Filed: Oct. 3, 1994

[51] Int. Cl.[6] .................................................. G05G 1/04
[52] U.S. Cl. ............................... 74/523; 74/528; 74/543; 74/545; 74/569
[58] Field of Search ............................. 74/523, 528, 529, 74/543, 545, 546, 569; 188/2 D

[56] References Cited

U.S. PATENT DOCUMENTS

| | | | |
|---|---|---|---|
| 877,714 | 1/1908 | Heermans. | |
| 2,793,541 | 5/1957 | Borcherdt | 74/528 |
| 2,815,769 | 12/1957 | Huyck | 74/529 |
| 3,250,350 | 5/1966 | Shimanckas | 74/523 |
| 5,187,998 | 2/1993 | Asano et al. | 74/523 |

FOREIGN PATENT DOCUMENTS

| | | |
|---|---|---|
| 0281241 | 9/1988 | European Pat. Off.. |
| 334306 | 9/1930 | United Kingdom. |
| 1061151 | 3/1967 | United Kingdom. |
| 1454002 | 10/1976 | United Kingdom. |

*Primary Examiner*—Rodney H. Bonck
*Assistant Examiner*—Chong H. Kim
*Attorney, Agent, or Firm*—Young & Thompson

[57] ABSTRACT

A brake operating mechanism comprises a frame, an articulatable beam movable relative to the frame, a force reacting fulcrum movable relative to both the frame and the beam and pivotably supporting the beam, and resilient means acting on one end of the beam. The other end of the beam is, in use, connected to a brake operating element, such as a brake cable. The fulcrum is movable, in use, between a first position in which the beam is in a maximum loading condition with the brakes, which the mechanism operates, applied and in which the beam is force balanced resiliently about the fulcrum and a second position nearer the one end of the beam than when in its first position and in which position the beam is unloaded as a result of the resilient means becoming grounded-out by the frame so as to render the force balance ineffective and allow the brakes to become released.

10 Claims, 5 Drawing Sheets

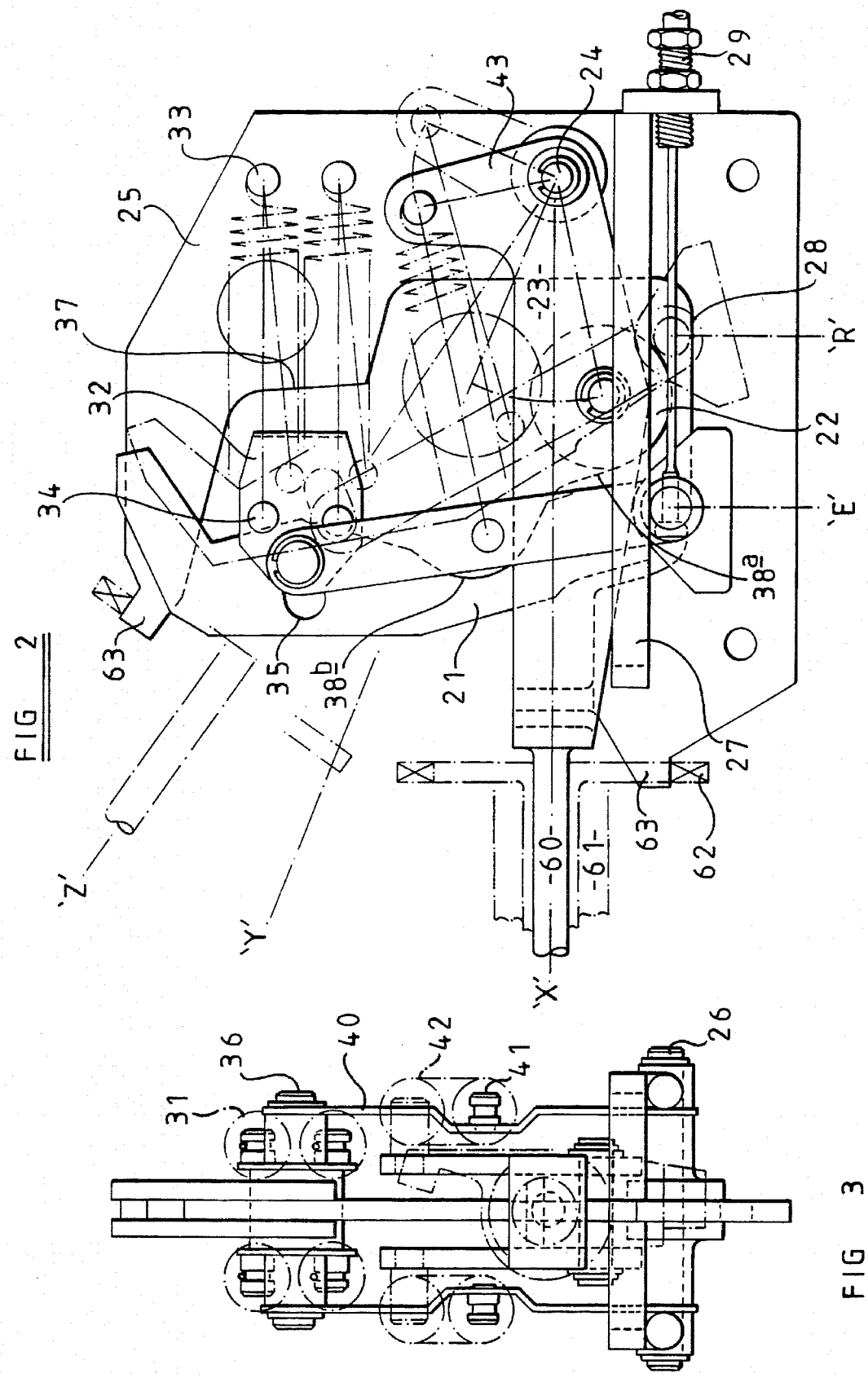

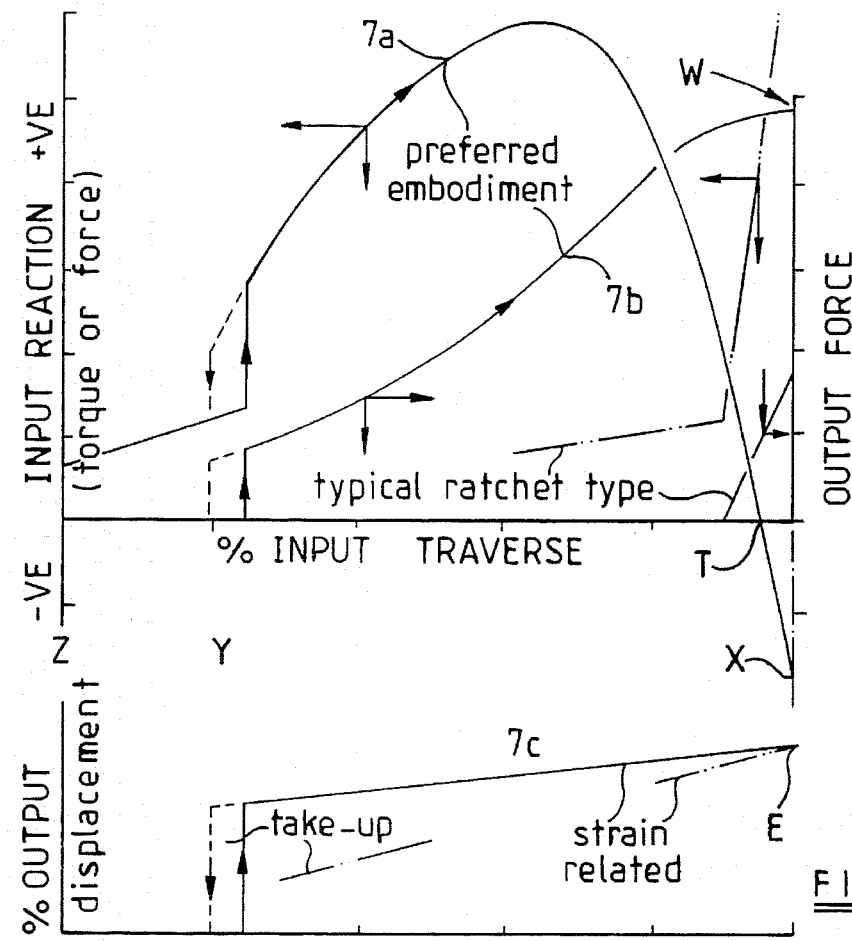
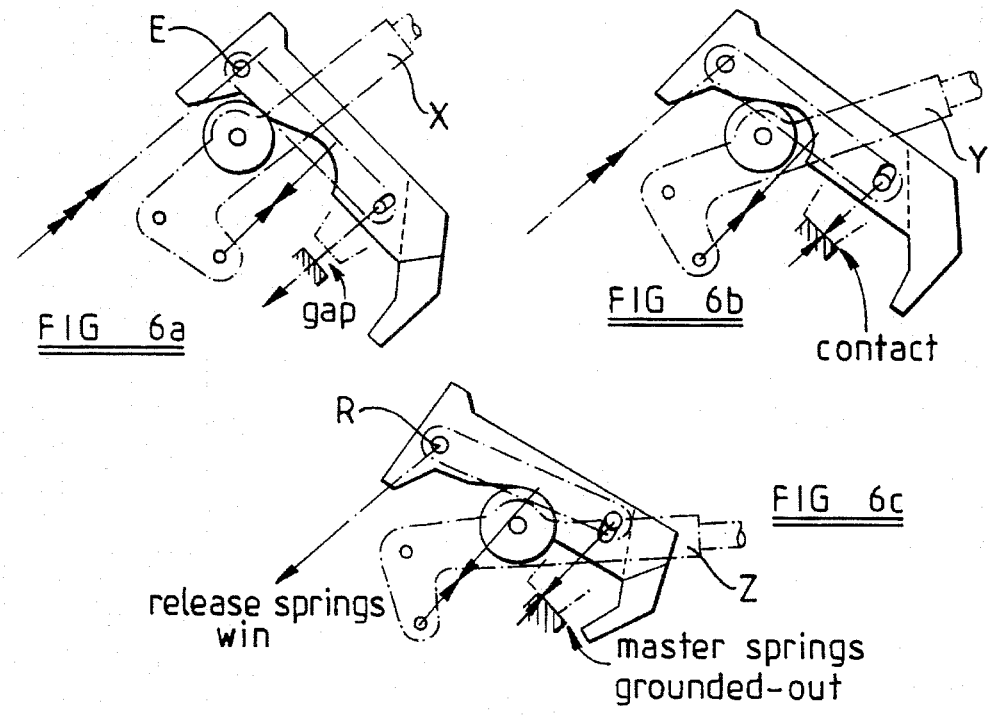

BRAKE OPERATING MECHANISM

INTRODUCTION

This invention relates to a brake operating mechanism, more praticularly but not exclusively, for vehicle parking brakes and, more particularly, to such a mechanism comprising spring and variable leverage linkage which can apply an enhanced/resilient displacement force at the operating element.

Hitherto, parking brake operating mechanisms of light and medium weight vehicles generally comprise non-resilient mechanical displacement operating elements where all the useful work done by the driver in strain loading the brake gripping elements takes effect within the final part of input traverse. Space considerations often restrict the mechanical advantage between hand or foot input traverse and operating element displacement. Parking/static-hold braking torque is often a matter of driver judgement, sometimes coupled with a show of strength and where lack of resilience can result in loss of grip arising from disc contraction, with consequent gradient or wind run-away hazards.

SUMMARY OF INVENTION

In accordance with a first aspect of the invention, there is provided a brake operating mechanism comprising a frame, an articulated beam movable relative to the frame, a force reacting fulcrum movable relative to both the frame and the beam and pivotally supporting the beam about the fulcrum, and resilient means acting on one end of the beam, the other end of the beam being for connection to a brake operating element, the fulcrum being movable in use between a first traverse position in which the beam is in a maximum loading condition with the brake/s, which the mechanism operates, applied and in which the beam is force balanced resiliently about the fulcrum so as to produce a resilient straining force and a second traverse position nearer said one end of the beam than when in its first traverse position and in which position the beam is unloaded in so far as the resilient means has become grounded-out relative to the frame so as to render the force balance, in a brake applying sense, ineffective and allow the brakes to be released.

In accordance with a second aspect of the invention, there is provided a brake operating mechanism comprising a frame, an articulated beam movable relative to the frame, resilient means acting on one end of the beam, the other end of the beam being for connection to a brake operating element which, in use, is held constantly in a loaded or semi-loaded state, to urge the beam towards a traverse position in which the brakes are released, a fulcrum defining part of which co-operates with the beam and which is movable along the beam from a second traverse position adjacent to said one end of the beam to increase the resilient straining force in the brake operating element and thereby apply the brakes, and means for releasing the urging force applied by the resilient means to said one end of the beam as the fulcrum moves from its second traverse position to its first traverse position.

Preferred and/or optional features of the invention are set out in claims 2 to 10 inclusive.

Advantage/s are summarised in one or more of the following:

(i) maximum braking force for minimum input effort, (ii) operating element resilience minimizes sensitivity to thermal variations and/or braking element wear, thereby reducing the need for frequent adjustment, (iii) inherently safe spring biased-on or latched static-hold, (vi) no necessity for separate ratchet, over-centre or toggle mechanism in respect of (iii)

(v) interchangeable with existing operating mechanisms and irrespective of type or location, (vi) may enable mechanical static-hold wheel brakes to be used in applications where previously operating element force impositions dictated either servo released spring brakes or low torque drive train transmission location.

BRIEF DESCRIPTION OF THE DRAWINGS

FIG. 2 is a side view of the brake operating mechanism shown in FIG. 1;

FIG. 3 is an end view of the brake operating mechanism shown in FIG. 1;

FIG. 6 shows the relative positions of the beam and fulcrum as the fulcrum is traversed between a brake applied and brake released traverse positions; and FIG. 7 shows typical comparative graphs.

DESCRIPTION OF THE PREFERRED EMBODIMENTS

Figure 1:
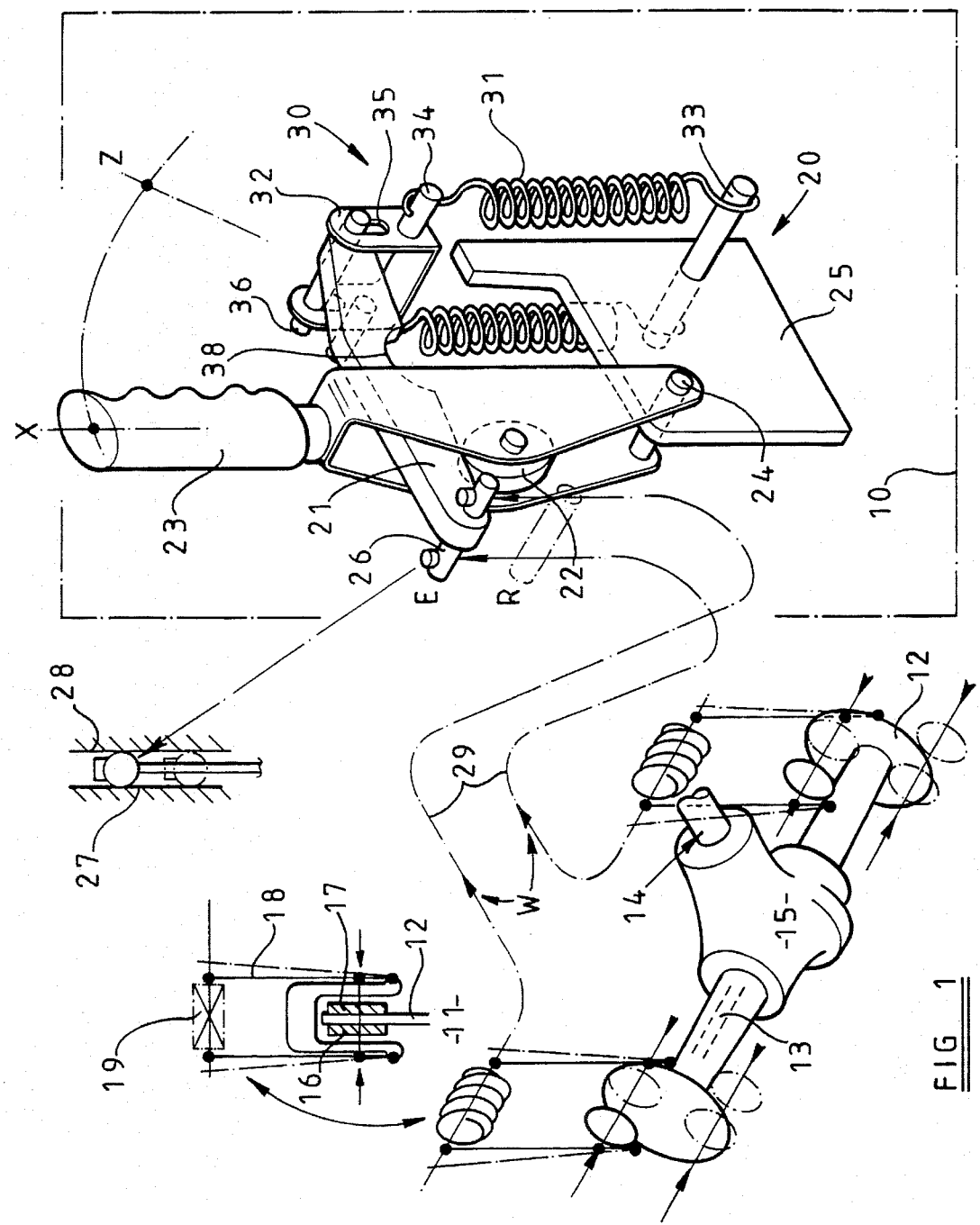
FIG. 1 is a pictorial view of a braking system incorporating one embodiment of a brake operating mechanism according to the invention, with parts omitted for clarity.

Referring firstly to FIGS. 1 to 3 of the drawings, there is shown therein a brake operating mechanism 10 for operating parking brakes 11 of a road vehicle. The parking brakes 11 are calliper brakes and co-operate with brake discs 12 secured to half shafts 13 which are driven by input shaft 14 via differential gear 15.

Each parking brake 11 comprises two gripping elements 16 and 17 supported by respective brake levers 18. A release spring 19 urges levers 18 to positions in which the gripping elements are out of engagement with brake disc 12. The brake discs 12 may also co-operate with other gripping elements which operate service/emergency braking, as shown, or may co-operate with common gripping elements and which may incorporate known self-adjustment.

The brake operating mechanism 10 comprises frame 20, a beam 21, a movable fulcrum in the form of a roller 22, and a brake operating lever 23 which supports the roller and which is pivotally connected to frame 20 by a bearing 24.

The frame 20 includes a plate 25, the beam being constrained by the plate against lateral movement relative to frame 20. One end of beam 21 is provided with a trunnion 26 which co-operates with guide-rails 27 and 28 defined by frame 20 to ensure that the beam moves correctly relative to the frame and the axis of the trunnion follows a rectilinear path. Brake cable 29 connect trunnions 26 to the parking brakes 11 and resilient means 30 is connected between frame 20 and the other end of beam 21. Resilient means 30 comprise tension springs 31 and clevis 32. One end of each tension spring 31 is connected to a pin 33 fixed to frame 20 and the other end of each tension spring is connected to a pin 34 fixed to the clevis 32. Elongated slots 35 are provided in the two arms of the clevis 32 and these slots receive a pin 36 fixed relative to the other end of the beam 21. These slots 35 allow some relative movement between beam 21 and clevis 32 for a purpose to be described hereinafter and base of clevis 32 is engageable with abutment 37 on the frame to ground-out the resilient means 30 in a manner to be described hereinafter. Alternatively, the slots 35 could be provided in the beam 21 and the pin 36 could be fixed to the clevis.

The beam has a non-linear track 38 having an inclined ramp surface 38a at the outer end and an arcuate surface 38b at the inner end and this track co-operates with the roller 22.

In operation, the brake cables 29 are preferably under constant tension due to the forces from release springs 19 so as to maintain the beam urged against roller 22 whenever the force of resilient means 30 is grounded-out.

When brake operating lever 23 is in its position X, as shown in FIGS. 1, 2 and 6a, roller 22 is in contact with the end of beam track 38 adjacent to trunnion 26. In this position, beam 21 is in a maximum loading output displacement condition E with the brakes 11 applied and the beam is force balanced resiliently about roller 22. In order to release brakes 11, the brake operating lever 23 is pivoted relative to the frame through intermediate traverse position Y (see FIG. 6b) to position Z (see FIGS. 1, 2, and 6c). As the lever is traversed from position X to position Z, the roller 22 rolls along the beam track 38. As it does so, the mechanical advantage provided by beam 21 at brake cables 29 reduces and the beam begins to pivot anti-clockwise as shown in FIG. 6 so as to release the tension applied to brake cables 29. As roller 22 rolls along the inclined ramp surface 38a of track 38, the base of clevis 32 comes into engagement with abutment surface 37 on frame 20 with the result that tension springs 31 no longer apply an urging force to the beam 21. As the roller 22 then continues to roll into the arcuate surface 38b of track 38, the beam 21 moves to an output displacement position R in which brakes 11 become released via release springs 19, the pin 36 on beam 21 being now free to ride along the slots in clevis 32.

As the brake operating lever 23 is traversed in the opposite direction from position Z towards position X, the roller 22 rolls along beam track 38 towards the end thereof adjacent to trunnion 26 and as it moves out of the arcuate section 38b of track 38, the pin 36 on the beam will move along the elongated slots 35 in the clevis and will then, via the clevis 32, act on the tension springs to extend the latter. The springs 31 will urge the beam 21 to pivot clockwise about roller 22 as shown in FIG. 6 to apply an increasing tension to brake cables 29 and as the roller moves further along track 38, the mechanical advantage provided by beam 21 will increase. The brakes 11, thereby, become progressively applied.

FIGS. 2 and 3 also show an optional arrangement for holding brake operating lever 23 in position X, i.e. in a position in which the brakes are applied. This arrangement comprises a pair of spaced links 40 connected together intermediate their ends by a pin 41. Tensions springs 42 are connected by pins 41 and the crank arms 43 on the brake operating lever 23. The links 40 co-operate with the beam so that springs 42 apply an urging force to the crank arms 43 in a direction to pivot the brake operating lever in a counter clockwise direction as input lever 23 is traversed towards position X, thereby ensuring bi-stable input traverse, notwithstanding any feedback gradient effect from ramp 38a of track 38.

The brake operating lever 23 may be manually operated or operated automatically in response to engine power monitoring apparatus acting in combination with overriding resilient traverse means, not shown, which returns lever 23 to position X in the event of engine shut down or failure.

Figure 4:
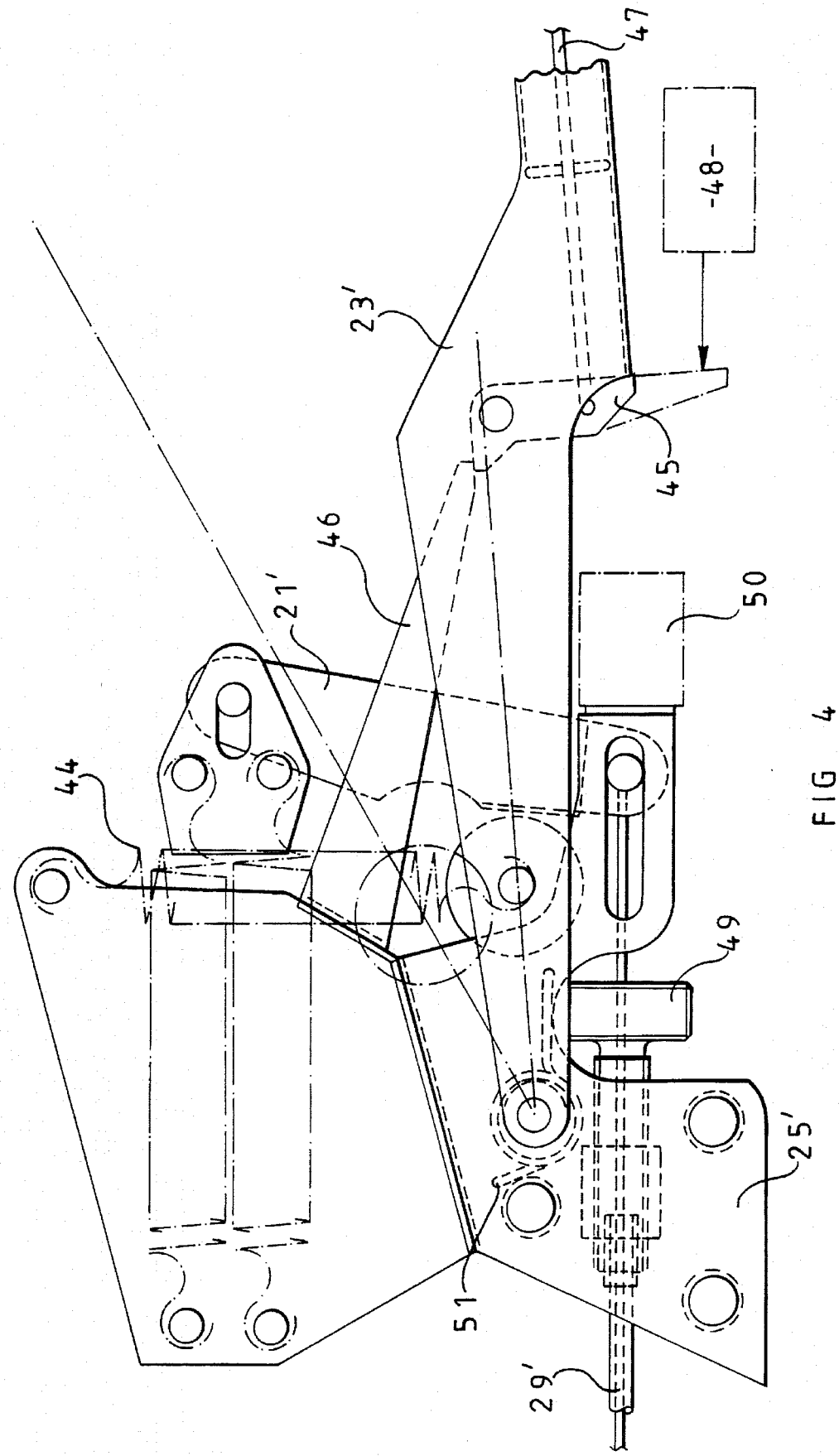
FIG. 4 is a side view of another embodiment of a brake operating mechanism according to the invention.

Referring now to FIG. 4, the brake operating mechanism shown therein differs in some respects from that shown in FIGS. 1 to 3. Like reference numerals have been used to indicate like parts. In the embodiment of FIG. 4, the brake operating lever 23', pivoted relative to spaced side plates 25', is biased to a brake released position by an artificial feel spring 44. Releasable latching means is provided to releasably hold brake operating lever 23' in a brake applied position. The releasable latching means comprises a latch 45 pivotably connected to the brake operating lever 23' and an abutment 46 which is secured to the frame and with which latch 45 engages. Latch 45 can be released manually by a thumb release push rod 47 or automatically by an additional release trip 48.

The embodiment of FIG. 4 is particularly applicable where the large mechanical advantage of the brake operating mechanism and that of associated brake units 11 may make it inappropriate to incorporate known self-adjustment. In such embodiments, manual adjustment of brake cable 29' may be made from the driver's seat by screw 49. A torsion spring 51 co-operates with a serrated head of screw 49 to prevent unintentional rotation. A sensor, for example micro switch 50, may co-operate with the trunnion end of beam 21' to provide tell-tale light indication of a pending need for adjustment.

Figure 5:
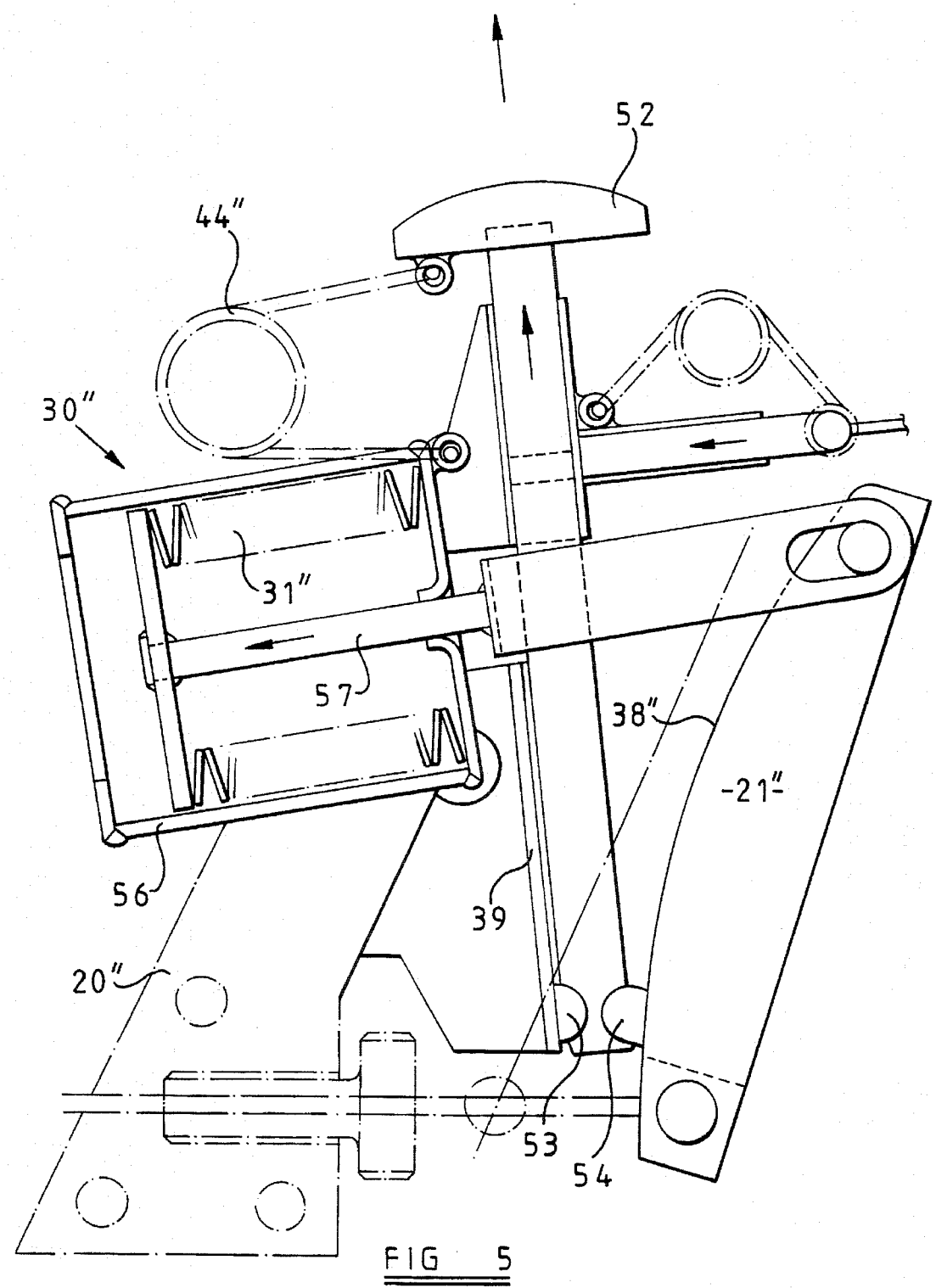
FIG. 5 is a side view of yet another embodiment of a brake operating mechanism according to the invention.

Referring now to FIG. 5, the operating mechanism shown therein comprises foot operated, rectilinearly movable input element 52 incorporating pivotably mounted shoes 53 and 54 which react the forces of track 38" of beam 21" and relatively fixed track 39. The radius of track 38" and the fixed gradient of track 39 combine to assist spring 44" and to impart a return force on the input element 52 towards traverse position Z. Captive resilient means 30" comprises a compressive spring 31", a housing 56 which is integral with frame 20" and a shaft 57 which is connected to the beam 21' via a pin and slot connection and which is urged by the spring 31" towards a position in which it grounds out on the housing 56". In similar embodiments but where the friction arising from sliding action of the shoes is excessive, there is the option of using contra-rotational rolling elements between the respective tracks and where reaction rollers may be spaced co-axially with the fulcrum roller.

FIGS. 6 and 7 are interrelated in respect of given input traverse positions 6a, 6b, and 6c.

The graphs shown in FIG. 7 relate to the first embodiment described with reference to FIGS. 1 to 3 and illustrate that for a given input traverse, the corresponding input reaction torque/force relative to percentage input traverse will occur as shown in curve 7a. There is a transition between positive and negative reaction which occurs at traverse position T, providing the bi-stable effect but which may benefit from the low hysterisis if the roller is of needle bearing type. However, an accidental knock off hazard can be avoided if the roller bearing incorporates known no-back features, forcing the roller to skid, and thereby increase friction relative to the beam, when the input lever is being traversed away from position X to effect brake release. The corresponding output force W is shown in curve 7b.

The lower curve 7c shows the corresponding operating element take up and strain related displacement.

Each of the curves 7a, 7b and 7c can be compared with the characteristic curves, typical of existing lever operating mechanism shown chain dotted.

Remote operation can avoid highly loaded upstream transmission lane cable and is better suited to heavy duty applications but requires sealing protection from the elements if the operating mechanism is integral with the brake/s or is otherwise exposed.

Irrespective of the particular build of hand operated embodiments, there is the further option to embody additional gates or latches as illustrated in FIG. 2 where stalk 60 of lever 23 supports handle 61 having dogs 62 and lock, not shown. Said dogs 62 engage with catches 63 to hold lever 23 either in input position X, key removed or Hold-Off input position Z, key in situ, thus providing optional anti-theft locking.

The embodiments described above are given by way of example only and various modifications will be apparent to persons skilled in the art without departing from the scope of the invention defined in the appended claims. For example the brake operating mechanism described above may be used in conjunction with band brakes as well as calliper brakes. Also, the brake cable could be replaced by one or more rigid operating elements or a conduit carrying hydraulic fluid and the term "brake operating element" used herein should be construed to cover these options.

What is claimed is:

1. A brake operating mechanism comprising a frame, an articulatable beam movable relative to the frame, a force reacting fulcrum movable relative to both the frame and the beam and pivotably supporting the beam, and resilient means acting on one end of the beam, the other end of the beam being for connection to a brake operating element, the fulcrum being movable in use between a first position in which the beam is in a maximum loading condition with the brakes, which the mechanism operates, applied and in which the beam is force balanced resiliently about the fulcrum and a second position nearer said one end of the beam than when in its first position and in which position the beam is unloaded as a result of the resilient means becoming grounded-out by the frame so as to render the force balance ineffective and allow the brakes to become released.

2. A brake operating mechanism as claimed in claim 1, wherein the beam has a non-linear track which co-operates with the fulcrum as the fulcrum moves between its first and second positions.

3. A brake operating mechanism as claimed in claim 1, wherein the fulcrum comprises as least one roller.

4. A brake operating mechanism as claimed in claim 1, wherein the fulcrum comprises at least one shoe.

5. A brake operating mechanism as claimed in claim 1, wherein the beam is constrained to move relative to the frame in such a way that, in use, the operating element is moved along a rectilinear path by the beam.

6. A brake operating mechanism as claimed in claim 1 further comprising an input lever pivotably supported by the frame, the fulcrum being supported by the input lever for movement between its first and second positions as the input lever is pivoted relative to the frame.

7. A brake operating mechanism as claimed in claim 1, wherein the frame includes at least one guide track and the fulcrum is supported for movement between its first and second positions by a co-acting force reaction element which co-operates between the beam and at least one guide track.

8. A brake operating mechanism as claimed in claim 2, wherein the track is shaped so as to define two stable conditions for the brake operating mechanism, one when the fulcrum is in its first position and the brakes are applied and the other when the fulcrum is in its second position and the brakes are released.

9. A brake operating mechanism as claimed in claim 1, wherein the fulcrum is urged towards its first position by second resilient means.

10. A brake operating mechanism as claimed in claim 1, wherein the fulcrum is urged towards its second position by third resilient means to provide artificial feel and wherein means are provided for releasably holding the fulcrum in its first position.

* * * * *